United States Patent Office 3,225,030
Patented Dec. 21, 1965

3,225,030
METHOD OF PREPARING LEUROSINE AND VINCALEUKOBLASTINE
Gordon H. Svoboda, Indianapolis, Ind., assignor to Eli Lilly and Company, Indianapolis, Ind., a corporation of Indiana
No Drawing. Filed Feb. 15, 1965, Ser. No. 432,873
2 Claims. (Cl. 260—236)

This application is a continuation-in-part of my copending application Serial No. 129,567, filed Aug. 7, 1961, which was a continuation-in-part of my application Serial No. 43,499, filed July 18, 1960, now abandoned, which was in turn a continuation-in-part of my application Serial No. 756,761, filed Aug. 25, 1958, now abandoned, in each case as to subject matter which has been continuously pending in the Patent Office in the application in question and in one or more of said later-filed applications.

This invention relates to a method of preparing the alkaloids, leurosine and vincaleukoblastine, in pure form from apocynaceous plant sources.

Leurosine, a dimeric indole-dihydroindole alkaloid, was first prepared from plants of the family Apocynaceae, specifically the species *Vinca rosea* Linn., by G. H. Svoboda. This research was published in J. Am. Pharm. Assoc. Sci. Ed., 47, 834 (1959). Vincaleukoblastine, another dimeric indole-dihydroindole alkaloid, was prepared independently at about the same time from plants of the identical species by R. L. Noble, C. T. Beer, and J. H. Cutts, as set forth in Bio. Chem. Pharm., 1, 347 (1958). The physical properties of these two alkaloids are fully described in a publication by N. Neuss, M. Gorman, G. H. Svoboda, G. Maciak and C. T. Beer, J. Am. Chem. Soc., 81, 4754 (1959). As pointed out in that publication, leurosine and vincaleukoblastine are closely related structurally and have essentially identical infrared spectra. The major differences in the infrared spectra consist of two added absorption bands in the vincaleukoblastine spectrum at 2.80 and 9.81 m$\mu$, attributable to hydroxyl absorption, which bands are not present in the infrared spectrum of leurosine. Vincaleukoblastine demonstrates a high degree of activity against experimental leukemias in mice, and is presently being marketed for the treatment of Hodgkin's disease and choriocarcinoma in humans.

Because other alkaloids have been derived from plants of the genus Vinca, including ajmalicine, tetrahydroalstonine, serpentine, lochnerine, reserpine, akuammine, vindolicine, vindoline, isoleurosine, catharanthine, lochnericine, perivine, catharine, vincamicine, lochneridine, sitsirikine, and virosine, and because of the close chemical and physical relationship of leurosine and vincaleukoblastine, it is not only extremely difficult to separate leurosine and vincaleukoblastine alkaloids from their companions, but it is even more difficult to separate them from each other.

It is an object of this invention to provide a process for preparing leurosine and vincaleukoblastine in pure form free from other alkaloids and from each other.

In fulfillment of the above and other objects, this invention provides a method for preparing leurosine and vincaleukoblastine in pure form which comprises wetting plants belonging to the family Apocynaceae, which plants have previously been shown to contain one or both of the above alkaloids, with an aqueous solution of a hydroxylated aliphatic polybasic acid at about pH 2, and extracting the wetted plant material with a volatile water-immiscible organic solvent; separating the organic solvent extract containing the weakly basic alkaloid fraction, including leurosine and vincaleukoblastine, from the acidified plant material which contains the strongly basic alkaloids; extracting the separated organic solution with an aqueous solution at about pH 2 of a hydroxylated aliphatic polybasic acid, thus causing the weakly basic alkaloids to pass into the acidic aqueous layer, and leaving the neutral alkaloids and other neutral substances in the organic layer; extracting, if desired, the acidic aqueous layer with a water-immiscible organic solvent, separating and discarding the organic layer; making the acidic aqueous layer basic and extracting the leurosine-vincaleukoblastine fraction into a volatile water-immiscible organic solvent; and then subjecting this alkaloid fraction to a chromatographic separation procedure in order to separate leurosine and vincaleukoblastine from each other and from their weakly basic companions.

There are many hydroxylated aliphatic polybasic acids which can be used in the above extraction process including tartronic acid (hydroxy malonic acid), lower alkyl-substituted tartronic acids, malic acid, glutanic acid ($\alpha$-hydroxy glutaric acid), $\beta$-hydroxy glutaric acid, 1,2-dihydroxylglutaric acid, 1,4-dihydroxyadipic acid, tartaric acid, citric acid, ascorbic acid, isocitric acid, D-saccharic acid, D-altromucic acid and the like. In general, the suitable hydroxylated aliphatic polybasic acids have from 1–3 carbon atoms in the carbon chain, 2 or 3 carboxyl groups, and from 1–4 hydroxyl groups. Tartaric acid is, of course, the preferred species because of cost.

Preferred water-immiscible organic solvents useful in the above process include benzene, ethylene dichloride, and chloroform.

The following example will illustrate the process of this invention more specifically: leaves, stems, or roots, or mixtures of these, of plants belonging to the species *Vinca rosea* Linn. of the family Apocynaceae are dried and ground. The dried, ground plant material is moistened with 2 percent tartaric acid (pH 2), and the moistened plant material is then extracted with benzene or the like. The weakly basic alkaloidal fraction, which fraction includes leurosine and vincaleukoblastine, passes into the benzene layer, which is separated and concentrated. The concentrate is then extracted with 2 percent tartaric acid (pH2), the leurosine-vincaleukoblastine fraction (weakly basic alkaloid fraction) passing into the acidic layer while the neutral alkaloids and other neutral substances remain in the organic phase. The organic phase is removed by distillation in vacuo, leaving the neutral fraction as an insoluble gum which is separated by filtration. The pH of the acidic aqueous phase is adjusted to about 2.3, and the acidic aqueous phase extracted with a water-immiscible organic solvent, preferably benzene. The acidic aqueous phase is again separated, and is then made basic with, for example, ammonium hydroxide, thus changing the weakly basic alkaloids present from the salt form into the free base. The alkaloidal free bases thus formed are extracted back into a water-immiscible organic solvent such as benzene, the benzene extract is concentrated, and the concentrate is adsorbed onto a chromatographic column. The various weakly basic alkaloids are then separated by preferential elution. For example, development of the chromatographic column with benzene serves to elute the less polar alkalodis such as catharanthine, vindolinine, vindoline, and ajmalicine. Isoluerosine, leurosine, and vincaleukoblastine are eluted in succession by mixtures of benzene and chloroform. A 1:1 or 1:3 mixture of benzene and chloroform is conveniently used as the eluting solvent for these latter alkaloids, although it will be apparent to those skilled in the art that other solvent mixtures of like polarity and benzene-chloroform mixtures of all proportions can be used. However, the use of less polar solvents and solvent mixtures merely prolongs the time necessary for elution and the use of the more polar solvent mixtures, while providing a more rapid elution process, yields a less clean-cut separation of leurosine and vincaleukoblastine. Fractions containing the two alkaloids are identified by thin-layer chromatography, or by salt formation, or by suitable color tests, and the alkalods can be crystallized from eluate fractions in which their presence has been detected, either in the form of the free base for leurosine, or in the form of a sulfate salt for vincaleukoblastine.

Leurosine and vincaleukoblastine are detected in chromatographic eluate fractions by various artifices. For example, an aliquot of each eluate fraction is evaporated in vacuo. The residue is dissolved in an amount of ethanol so as to give a convenient final concentration, and a drop of this ethanolic solution is chromatographed, using a thin-layer chromatogram with silica as the solid phase and a 1:1 ethyl acetate-ethanol solvent system as the mobile phase. Simultaneous chromatography of mixtures of pure samples of alkaloids, including isoleurosine, leurosine and vincaleukoblastine, provides reference standards against which the presence or absence of these latter alkaloids can be determined. Vincaleukoblastine and leurosine readily separate under these conditions. A standard color test such as Dragendorff's reagent is used to detect the presence of alkaloids on the chromatographic plate.

Another test is available for the detection of leurosine in the presence of isoleurosine and vincaleukoblastine in chromatographic eluate fractions, among other solutions. In this test, about 1 mg. of a dried residue from a chromatographic eluate fraction is dissolved in 1 ml. of benzene and an excess of methyl iodide is added thereto, thus forming the methiodides of the alkaloidal bases present. After the reaction has gone to completion, the benzene and excess methyl iodide are evaporated in vacuo. Ten drops of 75 percent sulfuric acid are added to the residue and the mixture is heated for 2 minutes at about 100° C. Four to five milliliters of a freshly prepared 1 percent ferric ammonium sulfate solution in 75 percent sulfuric acid is added. Leurosine methiodide gives a blue color, vincaleukoblastine methiodide a dirty gray-green color, and isoleurosine methiodide a pale yellow color under these conditions.

An additional test for the presence of vincaleukoblastine can be carried out on fractions which either originally contained neither leurosine nor isoleurosine, or from which these two alkaloids have been separated as crystalline free bases. In this test, the particular leurosine and isoleurosine-free mother liquor or eluate fraction is evaporated to dryness. About 0.15 g. of the resulting residue is dissolved in 5 ml. of ethanol. One present ethanolic sulfuric acid is added in 0.2 cc. quantities until the pH of the solution is lowered to about 4. At this point the acidified solution can be seeded, if desired, with previously obtained crystals of vincaleukoblastine sulfate. In either case, the solution is then chilled for about 24 hours. Presence of crystals in the chilled solution indicates the presence of vincaleukoblastine free base in the original fraction or mother liquor.

As can be seen, some of the above test procedures can be employed to yield pure leurosine or pure vincaleukoblastine by increasing the scale of the experiment.

In general, leurosine is most readily crystallized and purified in the form of the free base using ethanol or methanol as a solvent. Vincaleukoblastine, on the other hand, does not crystallize readily in the form of the free base and is, therefore, most conveniently purified by converting it to the sulfate salt and recrystallizing the sulfate salt from anhydrous ethanol or methanol. Leurosine can also be purified in the form of the sulfate salt if desired.

This invention is further illustrated by the following specific examples:

*Example 1*

Fifteen hundred grams of dried ground plant of *Vinca rosea* were intimately mixed with 1000 ml. of a 2 percent tartaric acid solution, and the mixture was extracted with three 9-liter portions of benzene. The benzene extracts were combined and were concentrated in vacuo to about 1500 ml. The concentrate was mixed with 1 liter of 2 percent tartaric acid and the mixture was steam-distilled under reduced pressure until all of the benzene had distilled over. The isoluble residue was dissolved in hot methanol, a second 1-liter portion of 2 percent tartaric acid solution was added, and the mixture was steam-distilled under reduced pressure until all the methanol had distilled. The undistilled aqueous tartaric acid solution was extracted with three 1-liter portions of ethylene dichloride, and was then brought to a pH of about 8.5–9.5 by the addition of 28 percent aqueous ammonium hydroxide. The ammoniacal solution was extracted with three 1-liter portions of ethylene dichloride; the ethylene dichloride extracts were combined, were dried, and were evaporated in vacuo, yielding a residue of 3.35 g. of a light-brown powder.

One and one-half grams of the residue were dissolved in 10 ml. of benzene, and the solution was passed over a chromatographic adsorption column containing 50 g. of alumina (Alcoa activated alumina, Grade F–20 obtainable from The Aluminum Company of America, Pittsburgh, Pennsylvania) which had previously been shaken for about 20 minutes with a mixture of 100 ml. of benzene containing 1.5 ml. of 10 percent acetic acid.

The column was developed by washing it with 2100 ml. of benzene. The column was then washed sequentially with 300 ml. of benbzene-chloroform solvent (95:5 by volume) and 800 ml. of benzene-chloroform solvent (75:25) to remove indeterminate impurities. The leurosine was eluted from the alumina by passing over the column 900 ml. of benzene-chloroform solvent (50:50). The eluate was evaporated to dryness in vacuo, leaving an amorphous residue of 113 mg. of leurosine. The residue was treated with a few ml. of methanol in which it quickly dissolved, but from which leurosine quickly precipitated in crystalline form. Because of the affinity of leurosine for water, and the presence of traces of water in the solvents, the leurosine was obtained in the form of its octahydrate. Although the material as obtained was substantially pure, it was further purified by recrystallizing it from hot methanol solution. The hydrated leurosine obtained decomposed at about 200–205° C.

Further elution of the above chromatographic column with a 50:50 benzene-chloroform solvent mixture or with a 25:75 benzene-chloroform solvent mixture serves to elute vincaleukoblastine. Vincaleukoblastine also occurs in the latter fractions containing leurosine. Vincaleukoblastine is obtained from vincaleukoblastine-containing fractions by evaporation to dryness, either of a filtrate from which leurosine has previously been isolated, or from a chromatographic eluate fraction. The resulting residue is dissolved in ethanol and 2 percent ethanolic sulfuric acid is added until the pH is lowered to about 4. The solution is seeded with crystals of vincaleukoblastine sulfate and is chilled for about 24 hours. Vincaleukoblastine sulfate, if present, precipitates during this period and can be separated by filtration. Vincaleukoblastine sulfate melts at about 284–285° C.

*Example 2*

Nine kilograms of ground, dried, whole *Vinca rosea* plants were defatted by stirring with two 45-liter portions of hexane and then discarding the hexane extracts. The defatted solids were moistened with 6 liters of aqueous 2 percent tartaric acid solution and were extracted by stirring with 3 successive 48-liter portions of benzene.

The benzene extracts were combined and were concentrated in vacuo to a volume of about 9 liters. To the concentrate were added 12 liters of aqueous 2 percent tartaric acid solution, and the organic solvent was removed by steam distillation under reduced pressure, during which operation the leurosine and vincaleukoblastine dissolved in the aqous acid layer in the form of their tartrate salts. Acid-insoluble material was separated by filtration. The filter cake was dissolved in methanol, 12 liters of aqueous 2 percent tartaric acid solution were added, and the above steam distillation procedure was repeated. The tartaric acid layer was filtered to remove undesirable insoluble material and the filtrate was combined with the previous tartaric acid filtrate. The combined filtrates were extracted with two 6-liter portions of ethylene dichloride. Tetrahydroalstonine, vindoline, and related alkaloids were extracted into the ethylene dichloride and were thus separated from the leurosine and vincaleukoblastine. The acidic aqueous solution was then made alkaline to litmus with ammonium hydroxide. Extraction of the ammoniacal solution with 6 liters of ethylene dichloride removed the weakly basic alkaloid fraction containing leurosine and vincaleukoblastine. Evaporation of the ethylene dicloride extract to dryness yielded about 20 g. of amorphous alkaloids. Ten grams of this residue were dissolved in benzene and the benzene solution was subjected to a preliminary chromatographic separation using as the solid phase 400 g. of alumina (Alcoa alumina, grade A–20) which had previously been deactivated by treatment with 12.5 ml. of 10 percent acetic acid. Elution was carried out with a series of solvents, as set forth below in Table I, the volume of each chromatographic fraction being arbitrarily set at 500 ml. Table I sets forth the results of the chromatographic separation procedure. In the table, column 1 gives the number of the fraction, column 2 the eluting solvent, and column 3 the major alkaloid obtained from that fraction.

TABLE 8

| Fraction | Eluting Solvent | Alkaloid |
| --- | --- | --- |
| 1 | Benzene | Catharanthine. |
| 2 | do | Vindolinine (obtained as dihydrochloride). |
| 3–19 | do | Ajmalicine. |
| 20–21 | do | Vindoline. |
| 34–42 | Benzene-chloroform (1:1) | Leurosine. |
| 43–45 | do | Vincaleukoblastine (obtained as sulfate). |

*Example 3*

Eight hundred kilograms of dried, ground leaves of *Vinca rosea* Linn. were placed in a 2200-gallon tank to which were added 5800 liters of thiophene-free benzene. A solution of 10.9 kg. of tartaric acid in 540 liters of water was added to the benzene suspension over a period of one hour and the mixture was agitated for about 2½ hours. The benzene layer was separated by decantation. An additional 4200 liters of thiophene-free benzene were added to the tartaric acid suspension and the mixture was agitated for about 2 hours. Once again the benzene layer was separated by decantation and was added to the first benzene layer. The tartaric acid suspension was extracted with two more 4200-liter portions of benzene and with one 2000-liter portion of benzene, and these three extracts were separated and were combined with the first two. The combined benzene extracts were evaporated to a volume of 500–550 liters in vacuo by heating to a temperature not exceeding 40° C. The benzene concentrate was cooled to about 30° C. and 890 liters of water were added followed by a solution of 21.4 kg. of tartaric acid in 178 liters of water. The mixture was concentrated to a volume of 850–900 liters by steam distilling the benzene in vacuo. An additional 280 liters of water were added and the residual benzene was removed by steam distillation in vacuo. The benzene-free tartaric acid solution was filtered to remove small quantities of insoluble material. Five hundred and forty liters of thiophene-free benzene were then added and the pH was adjusted in the range 2.9–3.1 by the addition of 28 percent aqueous ammonia. The benbenzene layer was separated and an additional benzene benzene were added, and the resulting mixture was stirred. The benzene layer was separated and discarded. The tartaric acid solution containing leurosine and vincaleukoblastine as tartrate salts was now made alkaline by the addition of 28 percent ammonia, the final pH being in the range 8.5–9.0. Five hundred and forty liters of benzene were added and the mixture was stirred. The benzene layer was separated and an additional benzene extract was made using 540 liters of benzene. The benzene extracts containing leurosine and vincaleukoblastine free bases were combined and were dried over anhydrous sodium sulfate. The sodium sulfate was removed by filtration and the filter cake was washed with benzene. The combined filtrate and washes were concentrated in vacuo to a volume of about 10–15 liters. The benzene extract was filtered again to remove small quantities of undesirable impurities and the filtrate was brought to a volume in the range 15–20 liters by the addition of benzene. A 500-gram aliquot of the above benzene solution was evaporated to dryness in order to determine the weight of crude alkaloid present.

One hundred and eighty liters of thiophene-free benzene were placed in a 400-liter pot and 119 kg. of activated alumina were added to the benzene slowly with stirring. Three hundred and fifty milliliters of glacial acetic acid and 7000 ml. of deionized water were added and the mixture was stirred for about ½ hour in order to deactivate the alumina. Forty liters of thiophene-free benzene were next poured into each of three stainless steel chromatographic columns having a glass wool pad in the bottom. One-third of the above slurry of deactivated alumina was added to each column while the column was being drained at the rate of about 900 cc. per minute. After the alumina had been added to each column, the liquid level was allowed to drop to about 12 inches from the top of the column but still above the level of the alumina. A benzene solution of 1200 g. of crude alkaloids was placed on each column. The chromatogram was developed by passing eight 120-liter portions of benzene (Fractions 1–8) through each column followed by eight 120-liter portions of 25 percent chloroform-75 percent benzene (Fractions 9–16); eight 120-liter portions of 50 percent chloroform-50 percent benzene (Fractions 17–24); three 120-liter portions of 75 percent chloroform-25 percent benzene (Fractions 25–27); and four 120-liter portions of chloroform (Fractions 28–31).

The eight 50 percent chloroform-50 percent benzene fractions were treated as follows: Three fractions—Fractions 17, 18 and 19—were concentrated under vacuum to a volume of about 2 liters each. Fractions 20–24 were combined and the combined fractions were concentrated to a volume of about 2 liters. The four 2-liter concentrates were each transferred to a tared 5-liter flask, the solvent was removed from each by evaporation in vacuo, and the weight of alkaloid in each flask was determined by difference. Methanol, to an amount of about 10 cc. per g. of dried residue, was added to each flask and each residue was dissolved in methanol with heat. The resulting solutions were chilled. Crystalline material, which precipitated during the chilling period, was collected by filtration. Crystals from Fractions 17–18 were crude isoleurosine and crystals from Fraction 19 and Fractions 20–24 combined were crude leurosine. Fractions 25–27 (75 percent chloroform-25 percent benzene) were treated in the same fashion, crystalline material again being crude leurosine. The mother liquor from the crystallization procedures on Fractions 17, 18, 19, 20–24 combined, 25, 26, and 27 were concentrated to dryness. Each residue was then tested for the presence of vincaleukoblastine by formation of vincaleukoblastine sulfate as follows: Each residue was weighed and was dissolved in ethanol with 5 ml. of ethanol being used for each 0.15 g. of residue. One percent ethanolic sulfuric acid was added in 0.2 cc. quantities to a 5-ml. aliquot of the above ethanol solution until the pH of the solution was lowered to about 4. The acidified solution was seeded with crystals of previously obtained vincaleukoblastine sulfate and was chilled for about 24 hours. The chilled flask was then examined for the presence of a precipitate of vincaleukoblastine sulfate which, if present, would signify that the original residue had contained vincaleukoblastine as the free base. Each of the fractions which the above test demonstrated as containing vincaleukoblastine was then treated in a similar fashion with sulfuric acid to convert any vincaleukoblastine to the crystalline sulfate salt. In this latter procedure, 12 ml. of ethanol, 2 cc. of 2 percent ethanolic sulfuric acid, plus 4 cc. of methanol were added for each gram of crude vincaleukoblastine. Further 2 percent ethanolic sulfuric acid was added until the pH was in the range 3.7–4.3. The solution was seeded with vincaleukoblastine sulfate and was chilled overnight. The precipitate of vincaleukoblastine sulfate thus formed was collected by filtration and the filter cake was washed with absolute ethanol. Vincaleukoblastine sulfate obtained as above was further purified by recrystallization from absolute ethanol.

Crystalline leurosine free base prepared as indicated in the above procedure from Fractions 19–27 was further purified by recrystallization from ethanol. Alternatively, leurosine can be converted to the sulfate by a procedure similar to that employed to form vincaleukoblastine sulfate. Leurosine sulfate can then be purified by recrystallization from absolute ethanol.

I claim:

1. A method for preparing vincaleukoblastine and leurosine, substantially free from each other and from other companion alkaloids, which comprises wetting plants belonging to the species *Vinca rosea* Linn. with an aqueous solution of a hydroxylated polybasic aliphatic acid at pH about 2, extracting the wetted plant material with a volatile water-immiscible organic solvent, separating the organic extract, contacting said organic extract with an aqueous solution of a hydroxylated polybasic aliphatic acid at pH about 2, separating the acidic aqueous layer, extracting the acidic aqueous layer with a water-immiscible organic solvent, again separating the acidic aqueous layer, making the acidic aqueous layer basic, extracting the thus formed alkaloidal free bases into a volatile water-immiscible organic solvent, subjecting the thus isolated free base fraction containing leurosine and vincaleukoblastine to a chromatographic separation procedure whereby leurosine and vincaleukoblastine are selectively eluted, crystallizing leurosine free base from chromatographic eluate fractions giving a positive test for leurosine, separating the crystalline leurosine, adding sulfuric acid to fractions giving a positive test for vincaleukoblastine, including mother liquor fractions from which leurosine has previously been separated, crystallizing the thus formed vincaleukoblastine sulfate, and separating the crystalline vincaleukoblastine sulfate.

2. The method of preparing leurosine and vincaleukoblastine in substantially pure form which comprises wetting dried ground plants of the species *Vinca rosea* Linn. with aqueous 2 percent tartaric acid solution, extracting the acidified plant material with benzene, separating the benzene extract, contacting the benzene extract with about 2 percent aqueous tartaric acid solution, separating the tartaric acid layer, extracting said tartaric acid layer with a water-immiscible organic solvent, again separating the tartaric acid layer, making the tartaric acid layer basic with ammonium hydroxide, extracting the thus fromed alkali-insoluble alkaloidal free bases into benzene, separating and concentrating said benzene extract, and then subjecting said benzene extract to a chromtographic separation procedure using deactivated alumina as the adsorbent, in which chromatographic separation procedure undesired alkaloids are eluted with benzene and leurosine and vincaleukoblastine are thereafter eluted wtih chloroform-benzene solvent mixtures, crystallizing leurosine from eluate fractions giving a positive leurosine test, and crystallizing vincaleukoblastine in the form of the sulfate salt from fractions, including mother liquors from leurosine-containing fractions, said fractions and mother liquors having previously given a positive test for vincaleukoblastine.

No references cited.

WALTER A. MODANCE, *Primary Examiner.*